United States Patent
Egedal et al.

(10) Patent No.: US 11,454,213 B2
(45) Date of Patent: Sep. 27, 2022

(54) DAMPING VIBRATIONS IN A WIND TURBINE

(71) Applicant: Siemens Gamesa Renewable Energy A/S, Brande (DK)

(72) Inventors: Per Egedal, Herning (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/312,189

(22) PCT Filed: Oct. 31, 2019

(86) PCT No.: PCT/EP2019/079839
§ 371 (c)(1),
(2) Date: Jun. 9, 2021

(87) PCT Pub. No.: WO2020/120017
PCT Pub. Date: Jun. 18, 2020

(65) Prior Publication Data
US 2022/0025861 A1    Jan. 27, 2022

(30) Foreign Application Priority Data

Dec. 13, 2018    (EP) .................................... 18212370

(51) Int. Cl.
*F03D 7/02*    (2006.01)

(52) U.S. Cl.
CPC ......... *F03D 7/0296* (2013.01); *F03D 7/0224* (2013.01); *F03D 7/0232* (2013.01);
(Continued)

(58) Field of Classification Search
CPC .... F03D 7/0296; F03D 7/0224; F03D 7/0232; F05B 2240/3052; F05B 2240/3062;
(Continued)

(56) References Cited

U.S. PATENT DOCUMENTS

| 4,692,095 A | 9/1987 | Lawson-Tancred |
| 5,106,265 A | 4/1992 | Holzem |

(Continued)

FOREIGN PATENT DOCUMENTS

| CN | 109996956 A | * 7/2019 | .......... F03D 1/0675 |
| EP | 1320680 A1 | 6/2003 | |

(Continued)

OTHER PUBLICATIONS

Plumley, C.E., et al.: "Supplementing wind turbine pitch control with a trailing edge flap smart rotor," 3rd Renewable Power Generation Conference ( RPG 2014). pp. 8.34-8.34, XP055343775, DOI: 10.1049/cp.2014.0919 ISBN: 978-1-84919-917-9, Abstract; Sections 2-6; the whole document; 2014; 6 pages.

(Continued)

*Primary Examiner* — Pedro J Cuevas
(74) *Attorney, Agent, or Firm* — Schmeiser, Olsen & Watts

(57) ABSTRACT

A method for damping vibration in a wind turbine including aerodynamic devices for influencing the airflow flowing from the leading edge of a rotor blade of the wind turbine to the trailing edge of the rotor blade, each aerodynamic device being movable by an actuator between a first protruded configuration and a second retracted configuration is provided. The method includes
measuring vibrations in the wind turbine,
if the measured vibrations are greater than a threshold within a predefined frequency band, moving a portion of the aerodynamic devices to the second retracted configuration and continuing to measure vibrations,
if the measured vibrations are still greater than a threshold within a frequency band, reducing the pitch angle interval of the blade and continuing to measure vibrations, (Continued)

if the measured vibrations are still greater than a threshold within a frequency band, moving all the aerodynamic devices to the second retracted configuration.

7 Claims, 3 Drawing Sheets

(52) U.S. Cl.
CPC ............... *F05B 2240/3052* (2020.08); *F05B 2240/3062* (2020.08); *F05B 2260/96* (2013.01); *F05B 2270/334* (2013.01); *F05B 2270/807* (2013.01); *F05B 2270/808* (2013.01); *Y02E 10/72* (2013.01)

(58) Field of Classification Search
CPC ............ F05B 2260/96; F05B 2270/334; F05B 2270/807; F05B 2270/808; Y02E 10/72
See application file for complete search history.

(56) References Cited

U.S. PATENT DOCUMENTS

| | | | |
|---|---|---|---|
| 8,851,840 B2 | 10/2014 | Hancock et al. | |
| 10,738,762 B2* | 8/2020 | Østergaard | F03D 7/0276 |
| 10,927,819 B2* | 2/2021 | Elmose | F03D 7/0224 |
| 11,078,885 B2* | 8/2021 | Akay | F03D 7/042 |
| 2011/0116927 A1* | 5/2011 | Hancock | F03D 1/0683 416/23 |
| 2012/0134803 A1* | 5/2012 | McGrath | F03D 7/0264 416/1 |
| 2019/0154001 A1* | 5/2019 | Østergaard | F03D 7/0276 |
| 2019/0186463 A1* | 6/2019 | Akay | F03D 7/0228 |
| 2019/0211805 A1* | 7/2019 | Elmose | G01M 13/045 |

FOREIGN PATENT DOCUMENTS

| | | | |
|---|---|---|---|
| EP | 1623111 A1 | 2/2006 | |
| EP | 2128385 A2 | 12/2009 | |
| EP | 3290688 A1 | 3/2018 | |
| EP | 3577338 A1 | 12/2019 | |
| EP | 3577339 A1 | 12/2019 | |
| WO | 2010023278 A2 | 3/2010 | |
| WO | 2010084131 A2 | 7/2010 | |
| WO | 2013087468 A1 | 6/2013 | |
| WO | 2018041420 A1 | 3/2018 | |

OTHER PUBLICATIONS

Andersen, P.B., et al.: "Deformable trailing edge flaps for modern megawatt wind turbine controllers using strain gauge sensors," Wind Energy, Wiley, Chichester, GB, vol. 13, No. 2-3, pp. 193-206, XP002692909, ISSN: 1099-1824, DOI: 10.1002/WE.371; [retrieved on Dec. 9, 2009], the whole document; Abstract, Paragraph [3.ControlAlgorithm]—Paragraph [4.Sensor]; Paragraph [9.Afullyelasticwindturbine]; 2010; 14 pages.
International Search Report and Written Opinion in corresponding PCT Patent Application No. PCT/EP2019/079839 dated Feb. 5, 2020. 12 pages.
Extended European Search Report in corresponding European Patent Application No. 18212370.3 dated Jun. 25, 2019. 8 pages.

* cited by examiner

DAMPING VIBRATIONS IN A WIND TURBINE

CROSS-REFERENCE TO RELATED APPLICATIONS

This application is a national stage entry of PCT Application No. PCT/EP2019/079839 having a filing date of Oct. 31, 2019, which claims priority to European Patent Application No. 18212370.3, having a filing date of Dec. 13, 2018, the entire contents of which are hereby incorporated by reference.

FIELD OF TECHNOLOGY

The following relates to a method for monitoring and damping excessive vibrations in a wind turbine.

BACKGROUND

A wind turbine rotor blade may have installed a flow regulating device on its surface, which flows from the leading edge to the trailing edge of a rotor blade of a wind turbine. An example of such a flow regulating device is a vortex generator (VG) installed on the suction side of the wind turbine rotor blade. In general, a flow regulating device may be considered to comprise a device which is capable of enhancing the lift coefficient of the aerofoil section, for example by increasing the level of energy of the boundary layer of the rotor blade.

Other aerodynamic devices may act in concert with the vortex generator and may influence the effect of the vortex generator depending on the state of the spoiler. Examples of the latter aerodynamic device are typically spoilers, installed on the suction side of the blade, between the trailing edge and the vortex generator. Alternatively, spoilers may be present alone, i.e. not combined with vortex generators or other flow regulating devices. Spoilers may be configured such that its shape and/or orientation can be regulated, e.g. by a pneumatic or hydraulic or mechanical actuator.

The spoiler may act in concert with the vortex generator and may influence the effect of the vortex generator depending on the state of the spoiler, i.e. a protrusion height and/or tilt angle by which the spoiler extends from or is tilted relative to other surface portions of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the airflow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

When an aerodynamic device is fully activated, the blade is stalled and consequently the aerodynamic damping of the blade is reduced. If other parts of the blade are also stalling due to e.g. soiling there is a risk that the damping will be too low and that blade oscillations start, resulting in excessive blade loads.

It is desirable to monitor the vibrations induced on the structure of a wind turbine by spoilers or other flow regulating aerodynamic devices and to regulate such aerodynamic devices to damp the induced vibrations.

SUMMARY

An aspect of the present invention relates to a method for damping vibration in a wind turbine including a plurality of aerodynamic devices for influencing the airflow flowing from the leading edge of a rotor blade of the wind turbine to the trailing edge of the rotor blade, each aerodynamic device being movable by an actuator between a first protruded configuration and a second retracted configuration. The method comprises the steps of:
  measuring vibrations in the wind turbine,
  if the measured vibrations are greater than a predefined threshold within a predefined frequency band, moving a portion of the aerodynamic devices to the second retracted configuration and continuing to measure vibrations in the wind turbine,
  if the measured vibrations are still greater than a predefined threshold within a predefined frequency band, reducing the pitch angle interval of the rotor blade and continuing to measure vibrations in the wind turbine,
  if the measured vibrations are still greater than a predefined threshold within a predefined frequency band, moving all the aerodynamic devices to the second retracted configuration.

The method of the present invention allows that the activation of the aerodynamic devices in the first protruded configuration does not cause instability problems in the blade.

According to embodiments of the present invention, the aerodynamic devices are flaps, i.e. an aerodynamic devices installed at the trailing edge of the rotor blade.

Alternatively, the aerodynamic devices are spoilers, i.e. an aerodynamic device installed in a position intermediate between the leading edge and the trailing edge of the rotor blade.

According to embodiments of the present invention, flaps and spoilers are together provided on the rotor blade.

The pitch angle interval of the rotor blade extends between a minimum pitch angle and a maximum pitch angle. According to embodiments of the present invention, the pitch angle interval is reduced by increasing the minimum pitch angle of the rotor blade.

According to embodiments of the present invention, the method of the present invention damps vibrations around the first blade flap mode. The first blade flap mode is the first oscillations mode of the rotor blade in a direction orthogonal to the chord of an aerofoil section of the rotor blade.

According to embodiments of the present invention, vibrations may be measured by means of:
  an acceleration sensor installed on the tower or on the nacelle or on the rotor blade, a load sensor installed on the tower or on the nacelle or on the rotor blade.

The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
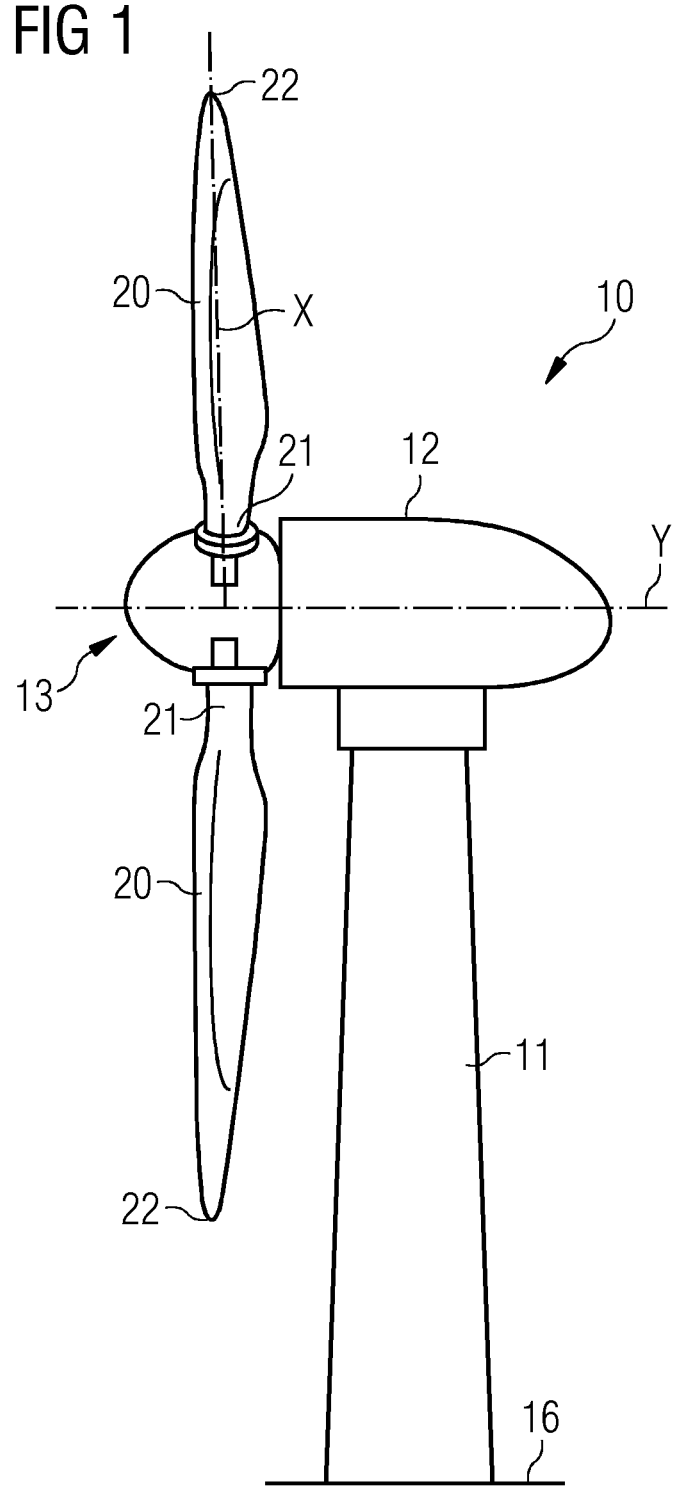
FIG. 1 depicts a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y.

The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 4 extend substantially radially with respect to the rotational axis Y.

Each rotor blade 20 is usually mounted pivotable to the hub 13, in order to be pitched about respective pitch axes X. This improves the control of the wind turbine and in particular of the rotor blades by the possibility of modifying the direction at which the wind is hitting the rotor blades 20.

Each rotor blade 20 is mounted to the hub 13 at its root section 21. The root section 21 is opposed to the tip section 22 of the rotor blade.

A pitch actuation system (either electric or hydraulic) is associated to the rotor blades 20 proximal to the respective root sections 21 for regulating the pitch angle of each blade. According to the different possible embodiments of the present invention, one single pitch actuation system may be provided for all rotor blades 20 or a plurality of pitch actuation systems may be provided, each serving one respective blade 20.

The pitch angle of each rotor blade 20 extends between a minimum pitch angle and a maximum pitch angle.

Figure 2:
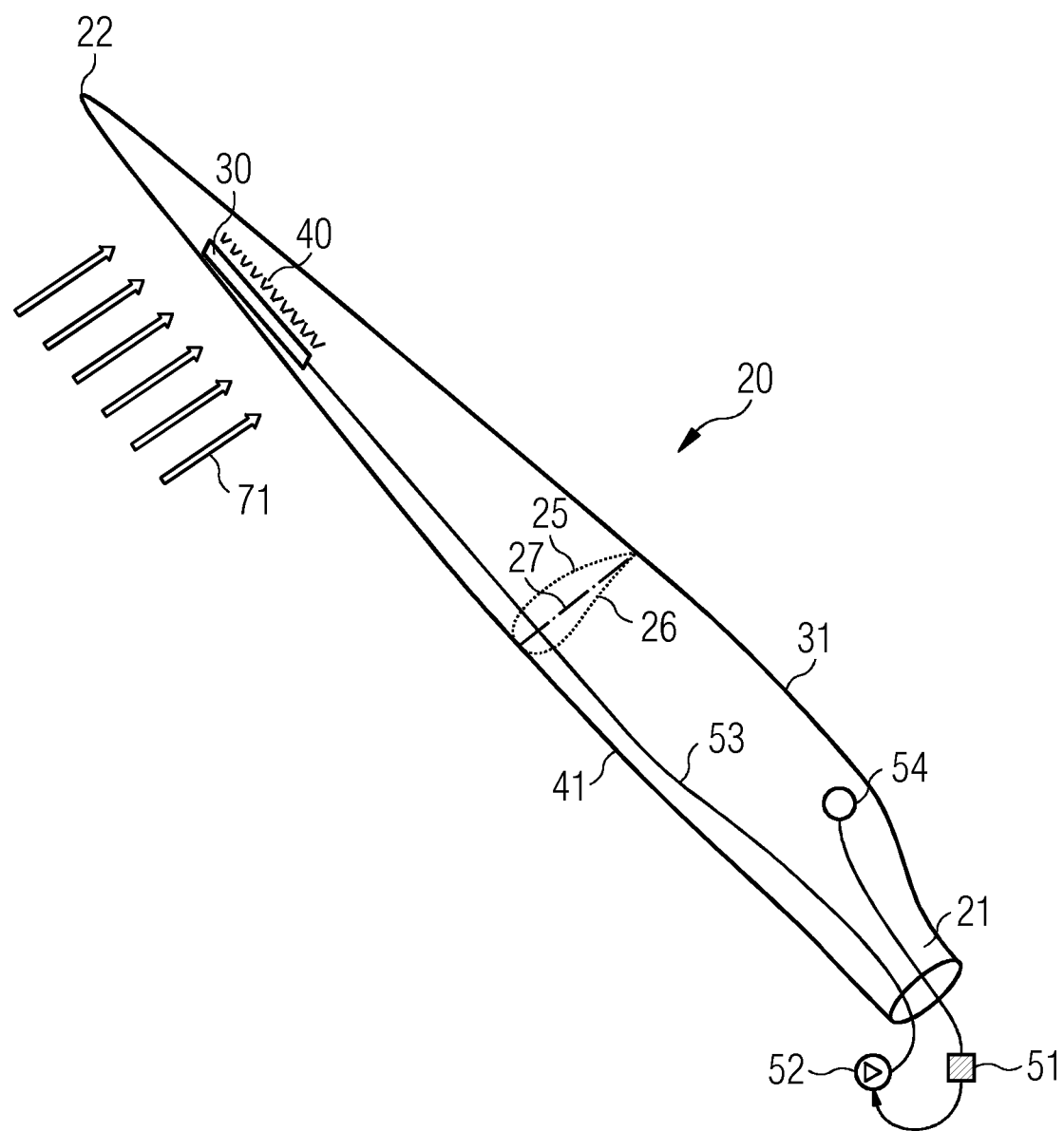
FIG. 2 depicts a rotor blade of a wind turbine with an aerodynamic device, which is operatable according to the present invention.

FIG. 2 illustrates the rotor blade 20 comprising an aerodynamic device 30 in the form of an actuated spoiler. Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by one aerofoil profile which is shown in FIG. 2 and which illustrates the cross-sectional shape of the rotor blade at this spanwise position. Also note that the suction side 25 is divided or separated from the pressure side 26 by a chord line 27 which connects a leading edge 41 with a trailing edge 31 of the rotor blade 20.

The aerodynamic device 30 in FIG. 2 is movable by means of a pressure line 53 connected to a pneumatic actuator 34. According to the embodiment of the attached figures, the pneumatic actuator 34 is realized as a hose. The hose 34 comprises an elastic outer skin, such that it can inflate and deflate reversibly and during many cycles when operated by means of the pressure line 53.

The pressure line 53 is comprised in a pressure supply system 52 and controlled by a control unit 51. The pressure supply system 52 provides pressurized air or other pressurized gas, to the pneumatic actuator 34. In this context, the term "pressurized fluid" not only implies positive pressure but also negative pressure, wherein fluid is sucked (or "drawn") out of the pneumatic actuator 34. The pressure line 53 could be in practice realized as tubes or pipes which do not significantly change their volume. The control unit 51 is responsible for setting a specific pressure at the pressure supply system 52 which subsequently leads to a certain predetermined pressure at the pneumatic actuator 34. By controlling the pressure of the pressurized air the pneumatic actuator 34 is operated between an inflated and a deflated configuration.

According to different embodiments of the present invention, any of the control unit 51 and the pressure supply system 52 may be located in the root section 21 of the rotor blade 20 or placed elsewhere in the wind turbine, such as e.g. in the hub 13 of the wind turbine 10 or in the nacelle 12 or in the tower 11.

The rotor blade 20 additionally comprises a flow regulating unit 40 comprising multiple pairs of vortex generators.

The flow regulating unit 40 are arranged on the suction side 25 of the blade 20 between the aerodynamic device 30 and the trailing edge 31.

According to other embodiments of the present invention (not shown in the attached figures), the flow regulating unit 40 are arranged on the suction side 25 of the blade 20 between the leading edge 41 and the aerodynamic device 30.

According to other embodiments of the present invention (not shown in the attached figures), the flow regulating unit 40 are not present and only the aerodynamic device 30 is used to regulate the flow on the surface of the blade 20.

According to other embodiments of the present invention (not shown in the attached figures), the blade 20 comprises a plurality of aerodynamic devices 30.

According to other embodiments of the present invention (not shown in the attached figures), the aerodynamic device 30 are configured as a trailing edge flap.

According to other embodiments of the present invention (not shown in the attached figures), the blade 20 may comprise a plurality of aerodynamic devices 30 including flaps and spoilers.

The rotor blade 20 additionally comprises one sensor 54 for measuring vibrations or loads on the rotor blade 20. The sensor 54 is connected to the control unit 51 for transmitting a vibration or load signal.

According to other embodiments of the present invention (not shown in the attached figures), the blade 20 may comprise a plurality of vibration or load sensors 54, distributed along the rotor blade 20.

Figure 3:
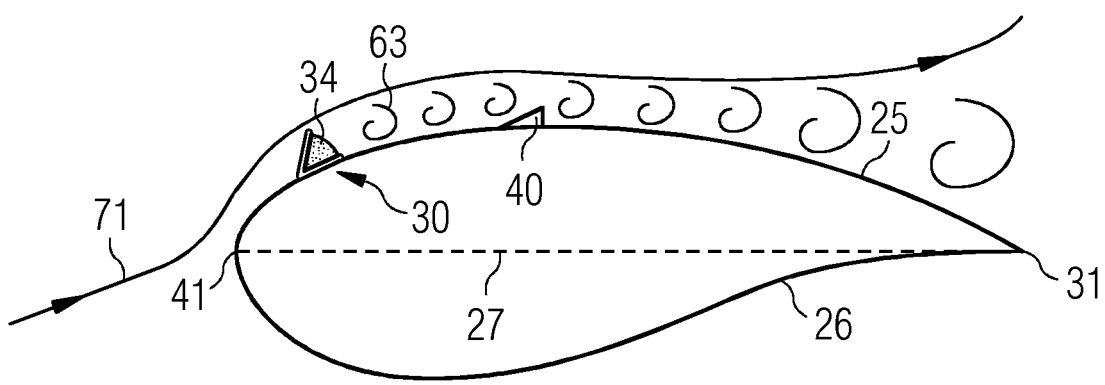
FIG. 3 depicts a first radial section of the rotor blade of FIG. 2.

FIG. 3 shows the aerodynamic device 30 in a first protruded configuration, corresponding to an inflated configuration of the pneumatic actuator 34.

In the first configuration the aerodynamic device 30 deviates the airflow 71 which is flowing from the leading edge 41 to the trailing edge 31 of the rotor blade.

The aerodynamic device 30 in the first protruded configuration induces stall. This is visualized with relatively large vortices 63 downstream of the aerodynamic device 30. A consequence of the induced stall is a decrease in lift of the rotor blade and, consequently, a reduced loading of the rotor blade and related components of the wind turbine.

Figure 4:
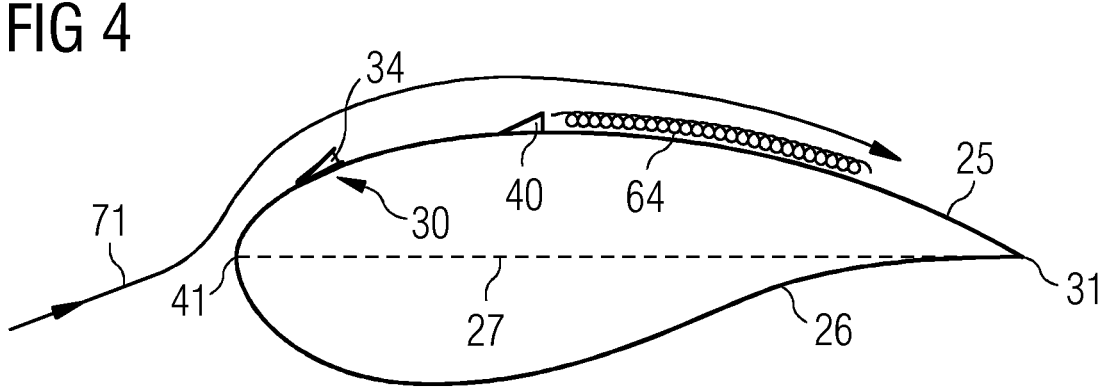
FIG. 4 depicts a second radial section of the rotor blade of FIG. 2.

FIG. 4 shows the aerodynamic device 30 in a second retracted configuration, i.e. moved downwards towards the surface of the rotor blade 20, corresponding to a deflated configuration of the pneumatic actuator 34.

In this second configuration, the airflow 71 flowing across the aerodynamic device 30 remains attached to the surface of the rotor blade 20, thus that no flow separation, i.e. stall, occurs. As a consequence, the lift of the rotor blade increases. Re-energizing vortices 64 are generated in the boundary layer by the vortex generators 40, which have the effect of helping increasing the lift. As a result, the highest lift values can be achieved.

By operating the pneumatic actuator 34 of the aerodynamic device 30 through the pressure line 53, the aerodynamic device 30 can be moved between the first protruded configuration and the second retracted configuration in order to vary the aerodynamic properties of the blade as desired and requested when operating the wind turbine 10.

According to the method of the present invention, when a vibration is detected, which is greater than a predefined threshold within a predefined frequency band, such vibration can be damped by operating the aerodynamic devices 30 alone or in combination with the blade pitch angle.

A vibration of the wind turbine 10 may be detected through the sensors 54 or through other sensors (not shown in the attached figures). For example vibrations may be measured also by means of an acceleration sensor installed on the tower or nacelle.

Particularly, but not exclusively, the present invention permits to damp vibrations around the first blade flap mode.

The method comprises the steps of:
measuring vibrations in the wind turbine,
if the measured vibrations are greater than a predefined threshold within a predefined frequency band, moving a portion of the aerodynamic devices to the second retracted configuration and continuing to measure vibrations in the wind turbine,
if the measured vibrations are still greater than a predefined threshold within a predefined frequency band, reducing the pitch angle interval of the rotor blade and continuing to measure vibrations in the wind turbine,
if the measured vibrations are still greater than a predefined threshold within a predefined frequency band, moving all the aerodynamic devices to the second retracted configuration.

The pitch angle interval of the rotor blade is reduced by increasing the minimum pitch angle of the rotor blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for damping vibration in a wind turbine including a plurality of aerodynamic devices for influencing an airflow flowing from a leading edge of a rotor blade of the wind turbine to a trailing edge of the rotor blade, each aerodynamic device being movable by an actuator between a first protruded configuration and a second retracted configuration, the method comprising:
measuring vibrations in the wind turbine;
if the measured vibrations are greater than a predefined threshold within a predefined frequency band, moving a portion of the aerodynamic devices to the second retracted configuration and continuing to measure vibrations in the wind turbine;
if the measured vibrations are still greater than the predefined threshold within the predefined frequency band, reducing a pitch angle interval of the rotor blade and continuing to measure vibrations in the wind turbine; and
if the measured vibrations are still greater than the predefined threshold within the predefined frequency band, moving all the aerodynamic devices to the second retracted configuration.

2. The method according to the claim 1, wherein the pitch angle interval of the rotor blade is reduced by increasing a minimum pitch angle of the rotor blade.

3. The method according to the claim 1, wherein the predefined frequency band includes a first blade flap mode.

4. The method according to claim 1, wherein vibrations are measured by means of an acceleration sensor installed on a tower or on a nacelle of the wind turbine or on the rotor blade.

5. The method according to claim 1, wherein vibrations are measured by means of a load sensor installed on a tower or on a nacelle of the wind turbine or on the rotor blade.

6. The wind turbine according to claim 1, wherein the aerodynamic devices are flaps.

7. The wind turbine according to claim 1, wherein the aerodynamic devices are spoilers.

* * * * *